United States Patent
Galbiati

(10) Patent No.: US 8,873,193 B2
(45) Date of Patent: Oct. 28, 2014

(54) CIRCUITRY FOR CONTROLLING A VOICE COIL MOTOR

(71) Applicant: STMicroelectronics S.r.l., Agrate Brianza (IT)

(72) Inventor: Ezio Galbiati, Agnadello Cremona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/013,968

(22) Filed: Aug. 29, 2013

(65) Prior Publication Data

US 2014/0063641 A1 Mar. 6, 2014

(30) Foreign Application Priority Data

Aug. 31, 2012 (IT) ................ MI2012A1464

(51) Int. Cl.
| | | |
|---|---|---|
| G11B 21/02 | (2006.01) | |
| G11B 21/12 | (2006.01) | |
| H02P 6/18 | (2006.01) | |
| G11B 5/54 | (2006.01) | |
| H02P 25/02 | (2006.01) | |
| G11B 19/20 | (2006.01) | |
| H02P 6/24 | (2006.01) | |

(52) U.S. Cl.
CPC ............ *G11B 19/2063* (2013.01); *G11B 21/12* (2013.01); *H02P 6/182* (2013.01); *G11B 5/54* (2013.01); *H02P 25/028* (2013.01); *H02P 6/24* (2013.01)
USPC .......................................... 360/75

(58) Field of Classification Search
USPC ........ 360/55, 71, 75, 69, 73.03, 77.02, 77.04, 360/78.04; 318/400.34, 459, 254.1, 560, 318/400.09, 280, 563, 652
See application file for complete search history.

(56) References Cited

U.S. PATENT DOCUMENTS

| | | | | |
|---|---|---|---|---|
| 7,924,526 | B1 * | 4/2011 | Chui et al. ....................... | 360/75 |
| 8,143,829 | B2 * | 3/2012 | Tan ............................ | 318/400.09 |
| 8,471,509 | B2 * | 6/2013 | Bonvin .................... | 318/400.34 |
| 8,659,250 | B2 * | 2/2014 | Maiocchi et al. ........ | 318/400.34 |
| 2010/0002331 | A1 | 1/2010 | Tan | |
| 2010/0165811 | A1 | 7/2010 | Bonvin | |
| 2012/0161678 | A1 | 6/2012 | Maiocchi et al. | |

FOREIGN PATENT DOCUMENTS

EP  1 863 164 A1  12/2007

* cited by examiner

*Primary Examiner* — Ali Neyzari
(74) *Attorney, Agent, or Firm* — Seed IP Law Group PLLC

(57) ABSTRACT

A control circuit of a voice coil motor is configured to move at least one read/write head of an hard disk into a parking position. The control circuit compares a received supply signal with a reference signal having a minimum value and a maximum value and a frequency. When the value of the supply signal is between the minimum value and the maximum value of the reference signal, the controller causes alternation of a working condition of the voice coil motor, when the value of said supply signal is higher than the value of the reference signal, and of a stop condition of the voice coil motor, when the value of said supply signal is lower than the value of the reference signal, with a frequency equal to the frequency of said reference signal.

28 Claims, 9 Drawing Sheets

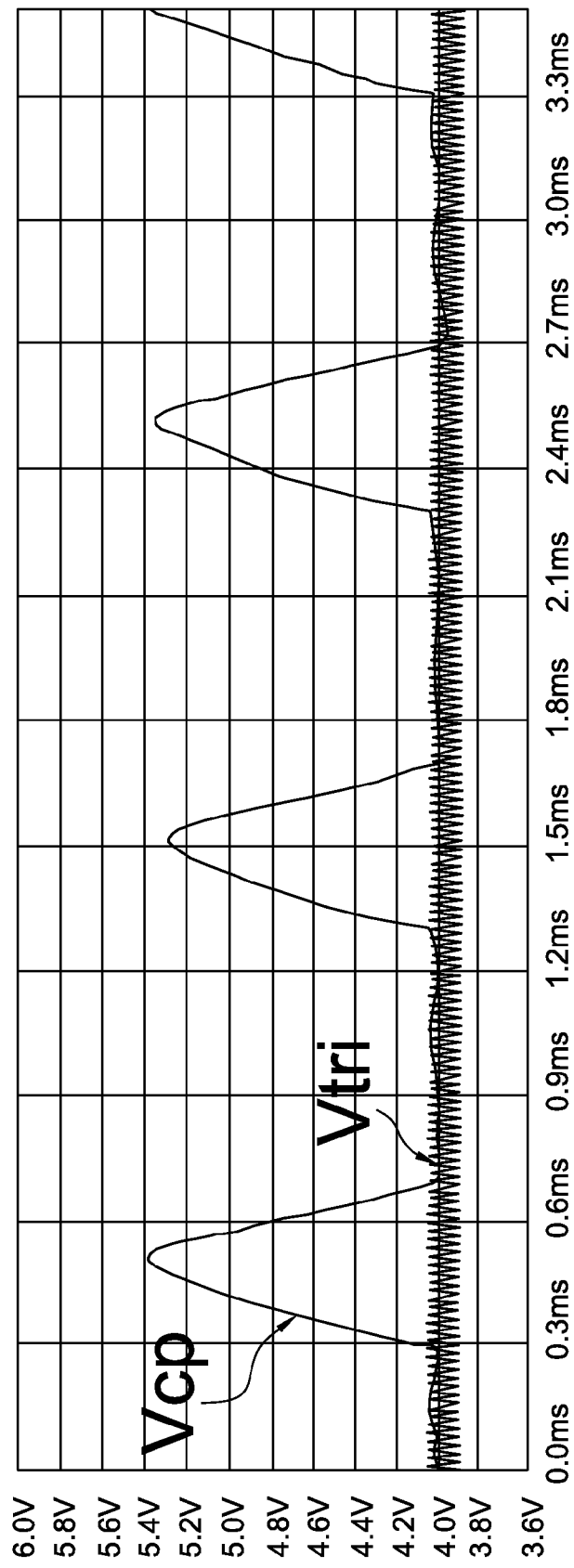
FIG. 5A1

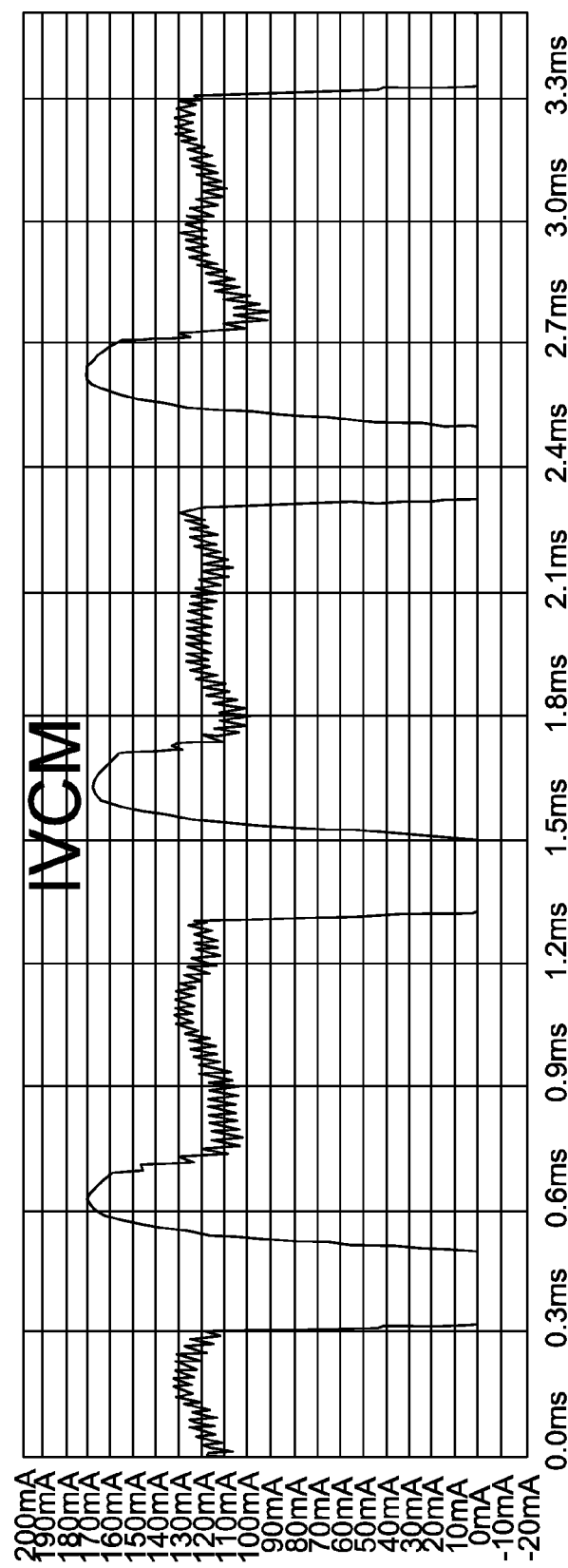
FIG. 5A2

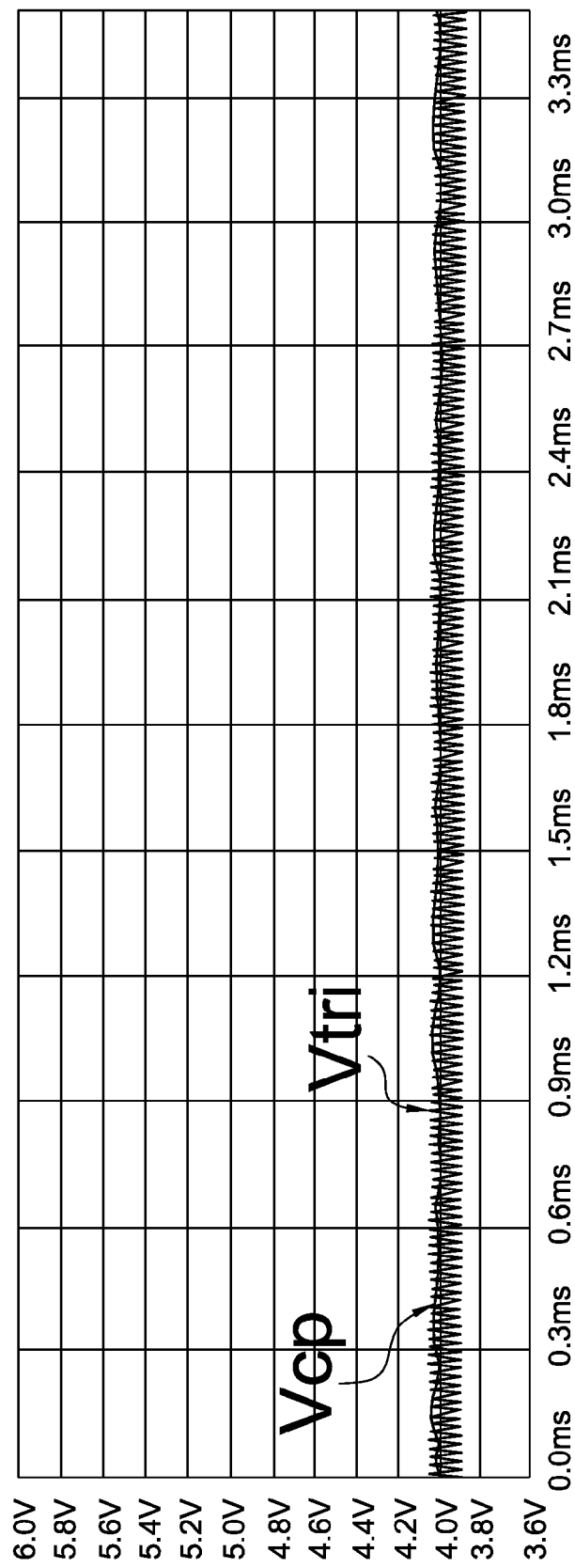
FIG. 5B1

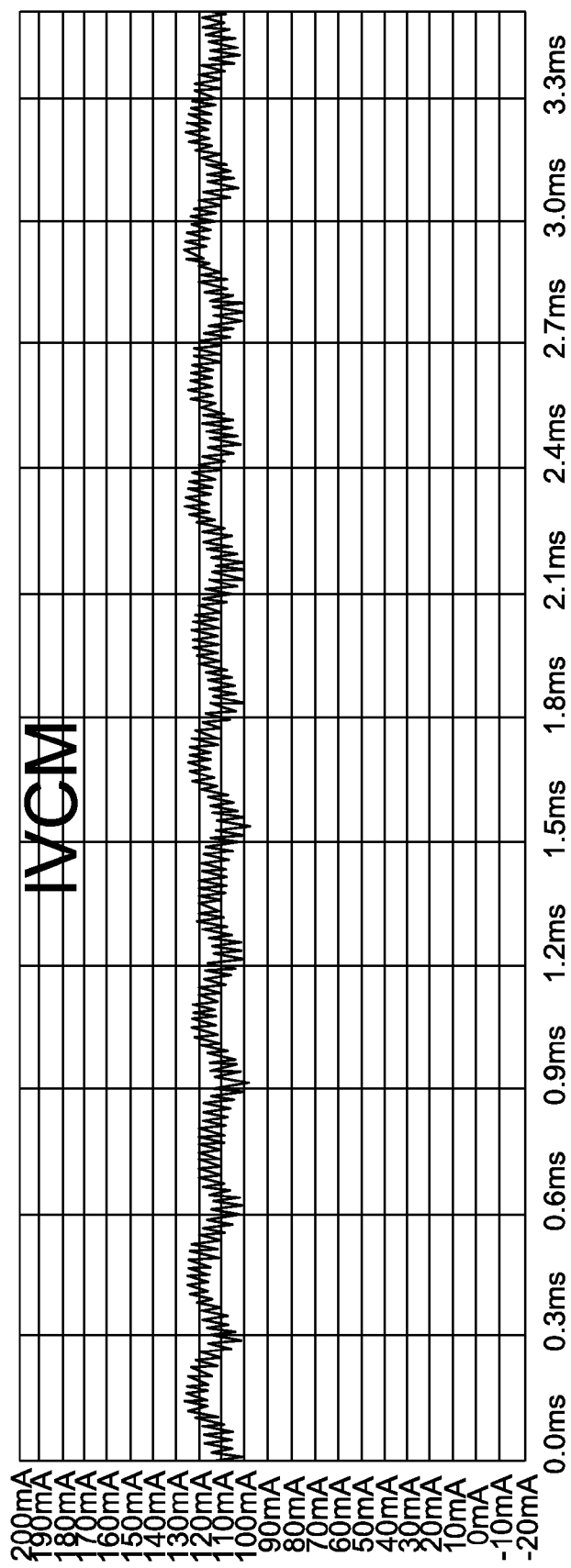
FIG. 5B2

CIRCUITRY FOR CONTROLLING A VOICE COIL MOTOR

BACKGROUND

1. Technical Field

The present disclosure relates to circuitry to control a voice coil motor, such as during the parking procedure of the read and/or write head of the hard disk at power off.

2. Description of the Related Art

In the state of the art, it is known that the hard disks of computers and the like are provided with a spindle motor for rotating the hard disk itself and a voice coil motor for moving the reading and writing heads.

In the event of a sudden lack of supply voltage, a procedure is implemented to first park the reading and writing heads, and then stop the spindle motor once the heads have reached the parking position.

In the absence of supply voltage, the spindle motor serves as a voltage generator, the voltage of which depends on rotational speed and its electric constant.

FIG. 1 shows the block diagram of a typical power combo used in applications for hard disks. The power combo is used to properly drive the spindle motor 2 and the voice coil motor 3 by a single driving circuit 1 which properly drives the power stage 12 for the spindle motor 2 and the power stage 13 for the voice coil motor 3, as better shown in FIG. 2. The driving circuit 1 comprises the driving circuit 10 of the power stage 12 of the spindle motor 2 and the driving circuit 11 of the power stage 13 of the voice coil motor 3. The power stage 12 comprises three pairs of transistors M1-M2, M3-M4, M5-M6 with respective pairs of diodes D1-D2, D3-D4, D5-D6 connected in parallel with each other between supply voltage Vmotor and ground GND, whereas the power stage 13 comprises two pairs of transistors M7-M8, M9-M10 with respective pairs of diodes D7-D8, D9-D10 connected in parallel with each other between supply voltage Vmotor and ground GND. The spindle motor 2 is coupled to the shared terminals of the pairs of transistors M1-M2, M3-M4, M5-M6, whereas the voice coil motor is coupled to the shared terminals of the pairs of transistors M7-M8, M9-M10.

The external supply voltage VCV feeding the power part may vary according to the type of application; in high end and desk top application it is typically of 12 volt while in mobile application it is typically of 5V.

The power combo, in addition to integrating the control of the two motors (spindle and voice coil motors), may comprise devices to implement other functions, e.g., voltage regulators and power monitor 4, serial port 5 and ISO-Fet 6.

The ISO-Fet is an internal element of the power combo that serves to insulate the internal supply line Vmotor from the external supply line VCV if the latter were to fail.

The ISO-Fet power up comprises a transistor connected to the voltage VCV and controlled by signal P; said signal P is adapted to shut down the transistor of the ISO-Fet when the voltage VCV falls under the threshold of the signal P, whereas it is adapted to keep it on when the voltage VCV is positive, that is above the threshold of the signal P.

When the VCV fails, the backelectromotive force voltage of the rotating spindle motor, i.e., the BEMF (Backelectromotive Force), is rectified to keep the internal supply line Vmotor at a potential enough to supply the section of the voice coil motor 3 for parking the heads.

The rectification of the backelectromotive force of the rotating spindle motor may be carried out by means of one of the following procedures, e.g., a passive rectification, a synchronous rectification of the BEMF of the spindle motor or a step up of the spindle motor.

The passive rectification implies a rectification of the BEMF of the spindle motor through the intrinsic diodes of the power stage 12 which is operated at high impedance.

The synchronous rectification of the BEMF of the spindle motor takes place in an active manner through the sequential power up of two MOSFET transistors of the power stage 12 in synchronicity with the phase of the three backelectromotive forces of the coils L1-L3 of spindle motor 2.

The rectification by means of the spindle motor step up implies that the power stage 12 is continuously switched from a tristate condition to a braking condition at a frequency higher than 20 KHz (out of the audible range), instead of being kept under the tristate condition. Thereby, when the power stage 12 is under the braking condition (with all the low side transistors being switched on or all the high side transistor being switched on), the spindle motor 2 is under a short-circuit condition and therefore the three backelectromotive forces are able to generate a current in the motor. When the power stage 12 is driven in tristate, the three motor currents generated during the braking step recirculate through the intrinsic diodes of the six transistors of power stage 12, thus loading the capacitance C3 connected between the line where there is the voltage Vmotor and ground GND, keeping it at an enough potential so as to supply the power stage 13 and voice coil motor 3 for parking the reading and writing heads; said parking procedure begins when rectifying the BEMF of the spindle motor 2.

The parking procedure of the reading and writing heads may be commonly carried out either at constant voltage or constant speed.

In the case of constant-voltage parking, the voice coil motor 3 is driven by the stage 13 applying a constant voltage for a certain time period T1, preset with an appropriate polarity for moving the heads in the correct parking direction, or the voice coil motor 3 is driven by the power stage 13 applying a first constant voltage for a time period T1 and a second constant voltage higher than the first voltage for another time period T2.

In the case of constant-speed parking, the voice coil motor is driven so as to keep the speed of reading and writing heads controlled during the parking procedure. Various methods are known in the state of the art to keep under control the speed by which the voice coil motor takes the reading and writing heads to a parking position. This type of procedure ends when the heads reach the parking zone; the control circuit 1 also comprises means adapted to detect when the reading and/or writing heads reach the parking position.

The control circuit of the parking procedure is supplied by the supply line Vmotor. However, for example, in mobile applications, the supply line Vmotor may not be high enough for correctly supplying the control circuit of the parking procedure. For this reason, an internal voltage regulator 20 supplied by a charge pump circuit 21 in turn supplied by the supply line Vmotor provides the supply voltage to the control circuit of the parking procedure. Therefore, in the case wherein the external supply voltage VCV is null, the charge pump circuit 21 provides to the internal voltage regulator 20 a supply voltage Vcp such as to correctly supply the internal voltage regulator 20.

BRIEF SUMMARY

The output voltage of the internal voltage regulator 20 may not be always at the nominal value because the supply line Vmotor varies; in this way the internal voltage regulator 20 may not assure the supply voltage necessary to the voice coil motor for the parking procedure of read and/or write heads.

In an embodiment, a control circuitry of a voice coil motor is configured to move at least one read/write head of an hard disk in a parking position, said control circuitry being configured to compare a received supply signal with a further signal having a given amplitude comprised between a minimum value and a maximum value and a given frequency, said circuitry being configured in such a way that, when the value of the supply signal is in the range between the minimum value and the maximum value of the further signal, it forces the alternation of a working condition of the voice coil motor, when the value of said supply signal is higher than the value of the further signal, and of a stop condition of the voice coil motor, when the value of said supply signal is lower than the value of the further signal, with a frequency equal to the frequency of said further signal. In an embodiment, the supply signal derives from the rectification of the back electromotive force voltage of a rotating spindle motor of said hard disk in absence of an external supply signal. In an embodiment, alternation of the working condition and stop condition of the voice coil motor is effectuated with a duty cycle depending on the position of the value of the supply signal inside the value range given by the minimum value and the maximum value of the further signal. In an embodiment, said duty cycle is high when the value of the supply signal is next to the maximum value of the further signal while is low when the value of the supply signal is next to the minimum value of the further signal. In an embodiment, the frequency of the further signal is out of the audible frequency range. In an embodiment, the control circuitry is adapted to drive a power stage of the voice coil motor, said stop condition of the voice coil motor occurring when the power stage is driven in tristate or brake condition.

In an embodiment, a control apparatus of a voice coil motor is configured to move at least one read and/or write head of an hard disk in a parking position in absence of an external supply voltage when the back electromotive force voltage of the rotating spindle motor of said hard disk is rectified to assure a supply voltage to the voice coil motor. In an embodiment, the control apparatus comprises: a device configured to raise said supply voltage deriving from the motor spindle at a level suitable to the parking of said at least one read/write head by said voice coil motor and outputting a supply signal; and a control circuitry of a voice coil motor as described herein.

In an embodiment, a method of controlling a voice coil motor to move at least one read/write head of an hard disk in a parking position, comprises comparing a supply signal with a further signal having a given amplitude between a minimum value and a maximum value and a given frequency, when the value of the supply signal is in the range between the minimum value and the maximum value of the further signal, forcing the alternation of a working condition of the voice coil motor, when the value of said supply signal is higher than the value of the further signal, and of a stop condition of the voice coil motor, when the value of said supply signal is lower than the value of the further signal, with a frequency equal to the frequency of said further signal. In an embodiment, the supply signal derives from the rectification of the back electromotive force voltage of a rotating spindle motor of said hard disk in absence of an external supply signal. In an embodiment, said alternation of the working condition and stop condition of the voice coil motor is effectuated with a duty cycle depending on the position of the value of the supply signal inside the value range given by the minimum value and the maximum value of the further signal. In an embodiment, said duty cycle is high when the value of the supply signal is next to the maximum value of the further signal, and is low when the value of the supply signal is next to the minimum value of the further signal. In an embodiment, the frequency of the further signal is out of the audible frequency range. In an embodiment, the stop condition of the voice coil motor occurs when the power stage of the voice coil motor is driven in tristate or brake condition.

In an embodiment, a controller comprises: a first input configured to couple to a charge pump of a hard disk; and circuitry coupled to the first input and configured to: compare a signal received at the first input to a reference signal having a frequency, a maximum value and a minimum value; and generate a head-parking control signal based on the comparison, wherein the circuitry is configured to generate the head-parking control signal with a frequency equal to the frequency of the reference signal when a value of the signal received at the first input is between the maximum value and the minimum value of the reference signal. In an embodiment, wherein the head-parking control signal controls cycling of a voice coil motor between a working mode of operation and a stop mode of operation when a value of the signal received at the first input is between the maximum value and the minimum value of the reference signal. In an embodiment, the head-parking control signal indicates the working mode of operation when the comparison indicates the signal received at the first input is greater than a value of the reference signal. In an embodiment, the head-parking control signal indicates the stop mode of operation when the comparison indicates the signal received at the first input is less than a value of the reference signal. In an embodiment, the signal received at the first input is generated by rectification of a back electromotive force voltage of a rotating spindle motor of the hard disk in an absence of an external supply signal. In an embodiment, the value of the signal received at the first input is between the maximum value and the minimum value, the head-parking control signal has a duty cycle depending on a position of the value of the signal received at the first input inside a value range given by the minimum value and the maximum value of the reference signal. In an embodiment, said duty cycle is high when the value of the signal received at the first input is closer to the maximum value than to the minimum value of the reference signal and low when the value of the signal received at the first input is closer to the minimum value than to the maximum value of the reference signal. In an embodiment, the frequency of the reference signal is out of an audible frequency range. In an embodiment, the controller is configured to drive a voice-coil-motor power stage in one of a tristate mode of operation and a brake mode of operation when the head-parking control signal indicates the stop mode of operation of the voice coil motor.

In an embodiment, a system comprises: voice-coil-motor driving circuitry; spindle-motor driving circuitry; and parking-control circuitry configured to: compare a voltage generated by a back electromotive force to a reference signal having a frequency, a maximum value and a minimum value; and generate a head-parking control signal based on the comparison, wherein when the voltage generated by the back electromotive force is between the maximum value and the minimum value of the reference signal, the head-parking control signal has a frequency equal to the frequency of the reference signal. In an embodiment, the system comprises: a spindle-motor power stage; and a voice-coil-motor power stage. In an embodiment, the system comprises: a spindle motor; and a voice-coil motor. In an embodiment, when the voltage generated by the back electromotive force is between the maximum value and the minimum value of the reference signal, the head-parking control signal controls cycling of a voice-coil motor between a working mode of operation and a stop mode of operation. In an embodiment, the head-parking control signal indicates the working mode of operation when the comparison indicates the voltage generated by the back electromotive force is greater than a value of the reference signal. In an embodiment, the head-parking control signal indicates the stop mode of operation when the comparison indicates the voltage generated by the back electromotive force is less than a value of the reference signal. In an embodiment, the parking-control circuitry is configured to initiate parking of one or more heads of disk drive by a voice-coil motor in response to loss of an external power supply signal. In an embodiment, the frequency of the reference signal is out of an audible frequency range. In an embodiment, the voice-coil-motor driving circuitry is configured to drive a power stage of the voice coil motor in one of a tristate mode of operation and a braking mode of operation when the head-parking control signal indicates the stop mode of operation of the voice coil motor. In an embodiment, the system comprises an integrated circuit including the voice-coil-motor driving circuitry, the spindle-motor driving circuitry and the parking-control circuitry.

In an embodiment, a method comprises: comparing a supply voltage signal of a hard disk to a reference signal, the reference signal having a minimum value, a maximum value and a frequency; and generating a head-parking control signal based on the comparison, wherein when a value of the supply voltage signal is between the maximum value and the minimum value of the reference signal, the head-parking control signal has a frequency equal to the frequency of the reference signal. In an embodiment, the reference signal has a triangular wave form with a medium value equal to a target value of the supply voltage signal. In an embodiment, the method comprises generating the supply voltage signal by rectifying a back electromotive force voltage of a rotating spindle motor of said hard disk in absence of an external supply signal. In an embodiment, the method comprises controlling, based on the head-parking control signal, cycling of a voice coil motor between a working mode of operation and a stop mode of operation when a value of the signal received at the first input is between the maximum value and the minimum value of the reference signal. In an embodiment, the head-parking control signal indicates the stop mode of operation when the comparison indicates the supply voltage signal is less than a value of the reference signal. In an embodiment, when the value of the supply voltage signal is between the maximum value and the minimum value, the head-parking control signal has a duty cycle depending on a position of a value of the supply voltage signal inside a value range given by the minimum value and the maximum value of the reference signal. In an embodiment, said duty cycle is high when the value of the supply voltage signal is closer to the maximum value than to the minimum value of the reference signal and low when the value of the supply voltage signal is closer to the minimum value than to the maximum value of the reference signal. In an embodiment, the frequency of the reference signal is out of an audible frequency range. In an embodiment, the method comprises driving a voice-coil-motor power stage in one of a tristate mode of operation and a brake mode of operation when the head-parking control signal indicates the stop mode of operation of the voice coil motor.

BRIEF DESCRIPTION OF THE SEVERAL VIEWS OF THE DRAWINGS

For a better understanding of the present disclosure, various embodiments are described, purely by way of non-limiting example and with reference to the annexed drawings, wherein:

FIGS. 5A1, 5A2, 5B1, 5B2 show example time diagrams of the voltage Vcp, the voltage Vtri and the current IVCM in the case of an embodiment of constant-speed parking procedure (FIGS. 5A1 and 5A2) and an embodiment of constant-voltage parking procedure (FIGS. 5B1 and 5B2) with the circuitry in FIG. 4;

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, voice coil motors, spindle motors, transistors, hard disks, processors, power supplies, memories, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
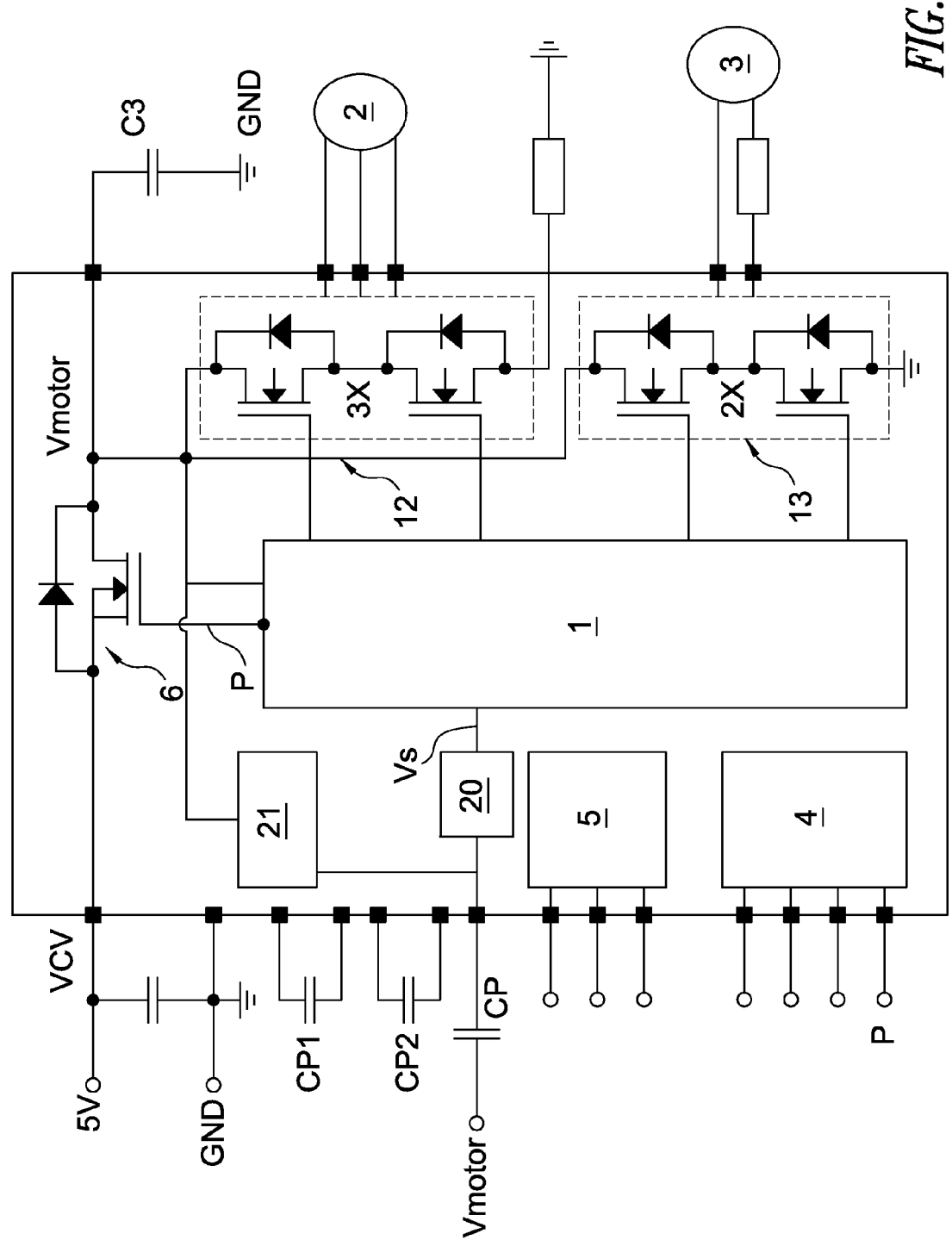
FIG. 1 shows a block diagram of a power combo for a hard disk application.
Figure 3:
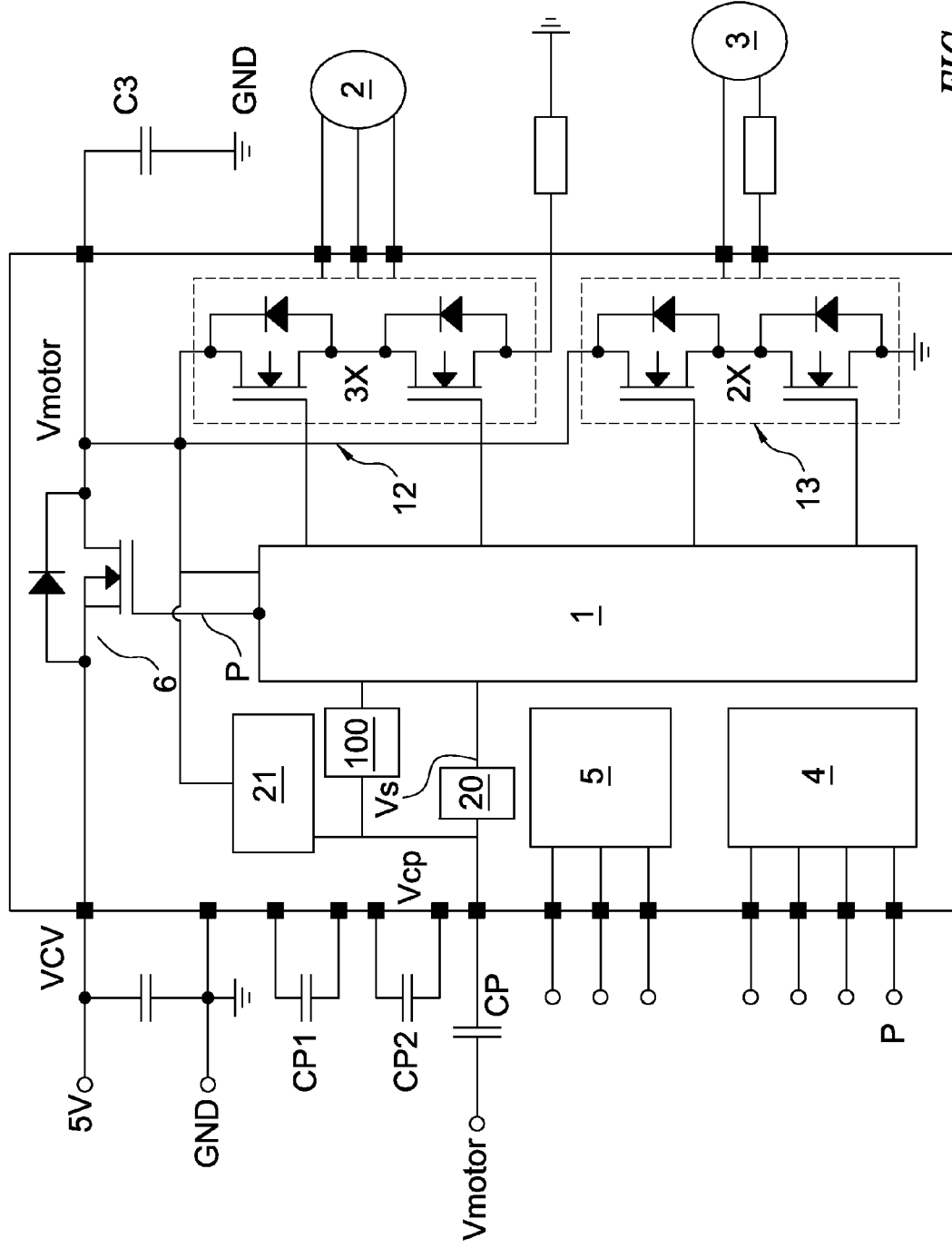
FIG. 3 shows a block diagram of a power combo for a hard disk application according to an embodiment.
Figure 4:
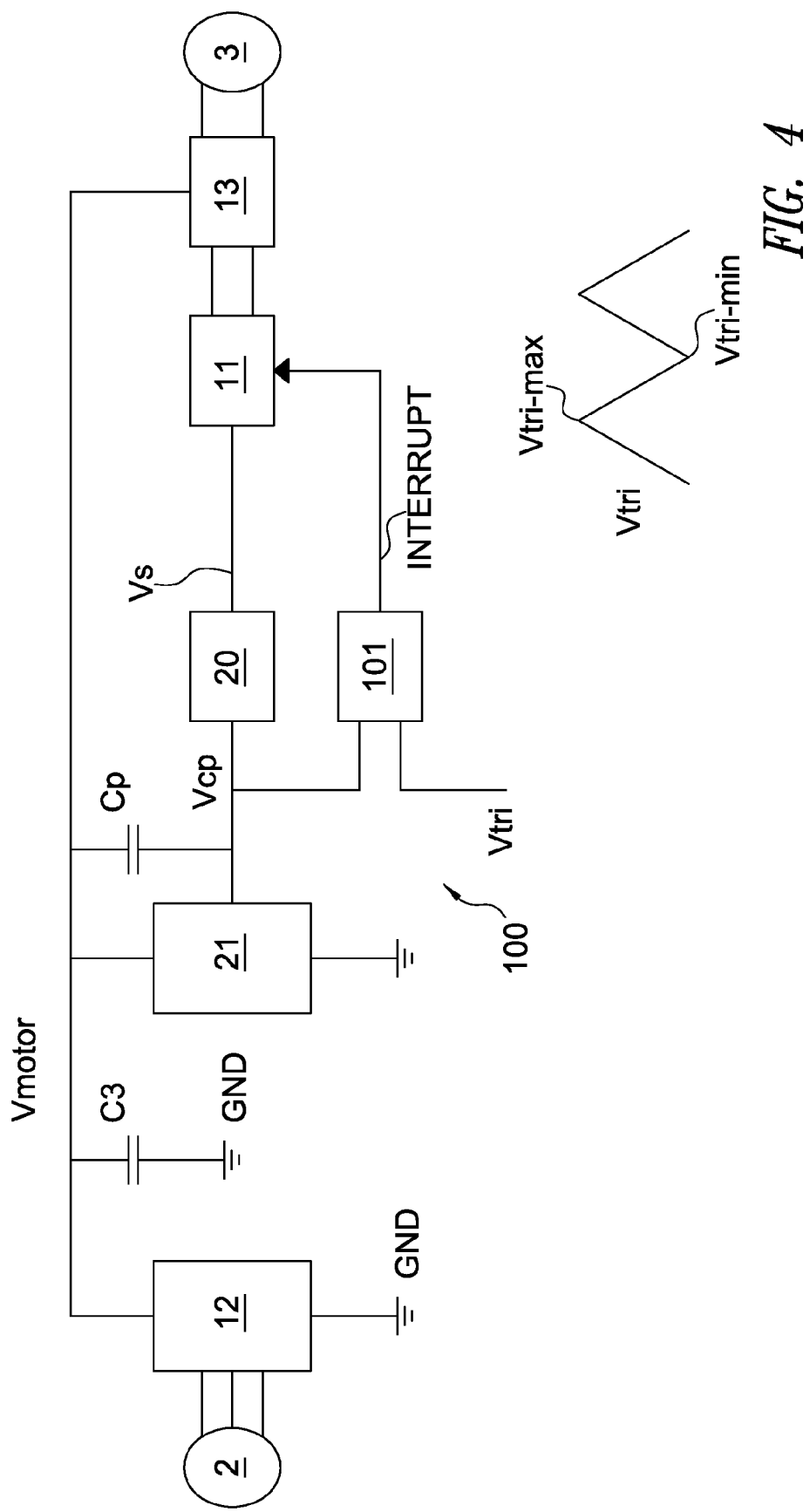
FIG. 4 shows a more detailed diagram of a circuitry for controlling the VCM during the parking procedure of the read and/or write heads at power off according to an embodiment.

An embodiment of a control circuit 100 configured to control the voice coil motor or VCM 3 to park the read and/or write heads of an hard disk according to the present disclosure is shown in FIGS. 3 and 4; the power combo shown in FIG. 3 is similar to the power combo in FIG. 1 except for the presence of the control circuit 100.

The control circuitry 100 is operative at power off, that is in absence of an external supply signal VCV (as shown in FIG. 3) and when the supply signal Vs of the control circuitry 100 derives from the rectification of a backelectromotive force voltage of the rotating spindle motor 2 adapted to move the hard disk.

As above mentioned, the backelectromotive force voltage of the rotating spindle motor 2, the BEMF (Backelectromotive Force), is rectified to keep the internal supply line Vmotor at a potential enough to supply the section of the voice coil motor 3 for parking the read and/or write heads.

The rectification of the backelectromotive force of the rotating spindle motor may be carried out by means of one of the following procedures, e.g., a passive rectification, a synchronous rectification of the BEMF of the spindle motor or a step up of the spindle motor as above mentioned. The rectification by means of the spindle motor step up implies that the power stage 12 is continuously switched from a tristate condition to a braking condition at a frequency higher than 20 KHz (out of the audible range), instead of being kept under the tristate condition. Thereby, when the power stage 12 is under the braking condition (with all the low side transistors being switched on or all the high side transistor being switched on), the spindle motor 2 is under a short-circuit condition and therefore the three backelectromotive forces are able to generate a current in the motor. When the power stage 12 is driven in tristate, the three motor currents generated during the braking step recirculate through the intrinsic diodes of the six transistors of power stage 12, thus loading the capacitance C3 connected between the supply line Vmotor and ground GND, keeping it at an enough potential so as to supply the power stage 13 and voice coil motor 3 for parking the reading and writing heads; said parking procedure begins when rectifying the BEMF of the spindle motor 2.

The parking procedure of the read and/or write heads may be commonly carried out either at constant voltage or constant speed as above mentioned.

FIG. 4 shows a charge pump circuit 21, supplied by the supply line Vmotor, which provides the supply signal Vcp to the control circuitry 100 of the voice coil motor 3 for the parking procedure in the case wherein the external supply voltage VCV is null. In an embodiment, a voltage regulator 20 is supplied by the supply signal Vcp which supplies the driving circuit 11 of the power stage 13 with a regulated voltage Vs; the charge pump circuit 21 provides to the internal voltage regulator 20 a supply voltage Vcp such as to correctly supply the internal voltage regulator 20 and the power stage 13 is supplied by the supply line Vmotor.

As better shown in FIG. 4, the charge pump circuit 21 is arranged between the supply voltage Vmotor and ground GND. A capacitor CP is coupled to the supply voltage Vmotor and an output of the charge pump 21; the charge pump circuit 21 outputs the voltage Vcp which is at the input of the control circuitry 100.

The control circuitry 100 is based on the monitoring of the minimum level of the supply signal Vcp at the output of the charge pump 21 to assure that the supply signal Vs of the internal voltage regulator 20 is maintained at the nominal value.

The monitoring the minimum value of the charge pump voltage Vcp is effectuated by the control circuitry 100 comparing instant by instant the voltage Vcp with a reference voltage signal Vtri with a given amplitude comprises between a minimum value Vtri-min and a maximum value Vtri-max, with Vtri-min different from Vtri-max, and a given frequency f; the control circuitry 100 is configured in such a way that, when the value of the supply signal Vcp is in the range between the minimum value Vtri-min and the maximum value Vtri-max of the signal Vtri, the same control circuit 100 forces the alternation of a working condition, when the value of said supply signal Vcp is higher than the value of the signal Vtri, and of a stop condition, when the value of said supply signal Vcp is lower than the value of the signal Vtri, of the voice coil motor 3 with a frequency equal to the frequency f of the signal Vtri. The working condition is the normal condition wherein the voice coil motor is parking the read and/or write heads of the hard disk while the stop condition is the condition wherein the voice coil motor 3 stop the parking of the read and/or write heads of the hard disk; in the stop condition of the voice coil motor 3 the power stage 13 is driven in a brake or tristate condition where in the brake condition all the low side transistors M8, M10 or all the high side transistor M7, M9 are switched on and the voice coil motor 3 is short circuited while in the tristate condition there is a recirculation step of the currents through the intrinsic diodes D7-D10 of the power stage 13.

The control circuitry 100 is configured to control the VCM 3 in stop condition always when the voltage Vcp is lower than the minimum value Vtri-min of the voltage Vtri while when the voltage Vcp is higher than the maximum value Vtri-max of the voltage Vtri the control circuitry 100 does not act.

When the power stage 13 of the VCM 3 is in tristate or brake condition, the level of the voltage Vmotor rises because the spindle motor is not under charge and the charge pump voltage Vcp consequently rises.

In an embodiment, the control circuitry 100 comprises a comparator 101 adapted to compare instant by instant the value of the voltage Vcp with the value of the voltage signal Vtri; the comparator 101 is configured to send to the driving circuit 11 a head-parking control signal INTERRUPT, for example at high logic level when the value of the voltage Vcp is higher than the voltage Vtri while the comparator 101 is configured to send to the driving circuit 11 a signal INTERRUPT at low logic level when the value of the voltage Vcp is lower than the voltage Vtri controlling the driving circuit 12 so as to force the power stage 13 in tristate or brake condition.

The voltage Vtri has frequency f. In an embodiment, the frequency f is selected in a frequency range higher than the audible frequency range, e.g., higher than 20 Khz; in this way acoustic noise may be reduced or prevented.

In an embodiment, the voltage Vtri has an amplitude of one hundred or some hundreds of millivolts about a medium value which is the target value of the signal Vcp; the amplitude of the voltage Vtri determines the voltage range wherein the supply signal Vcp enters in a protection zone.

Figure 6:
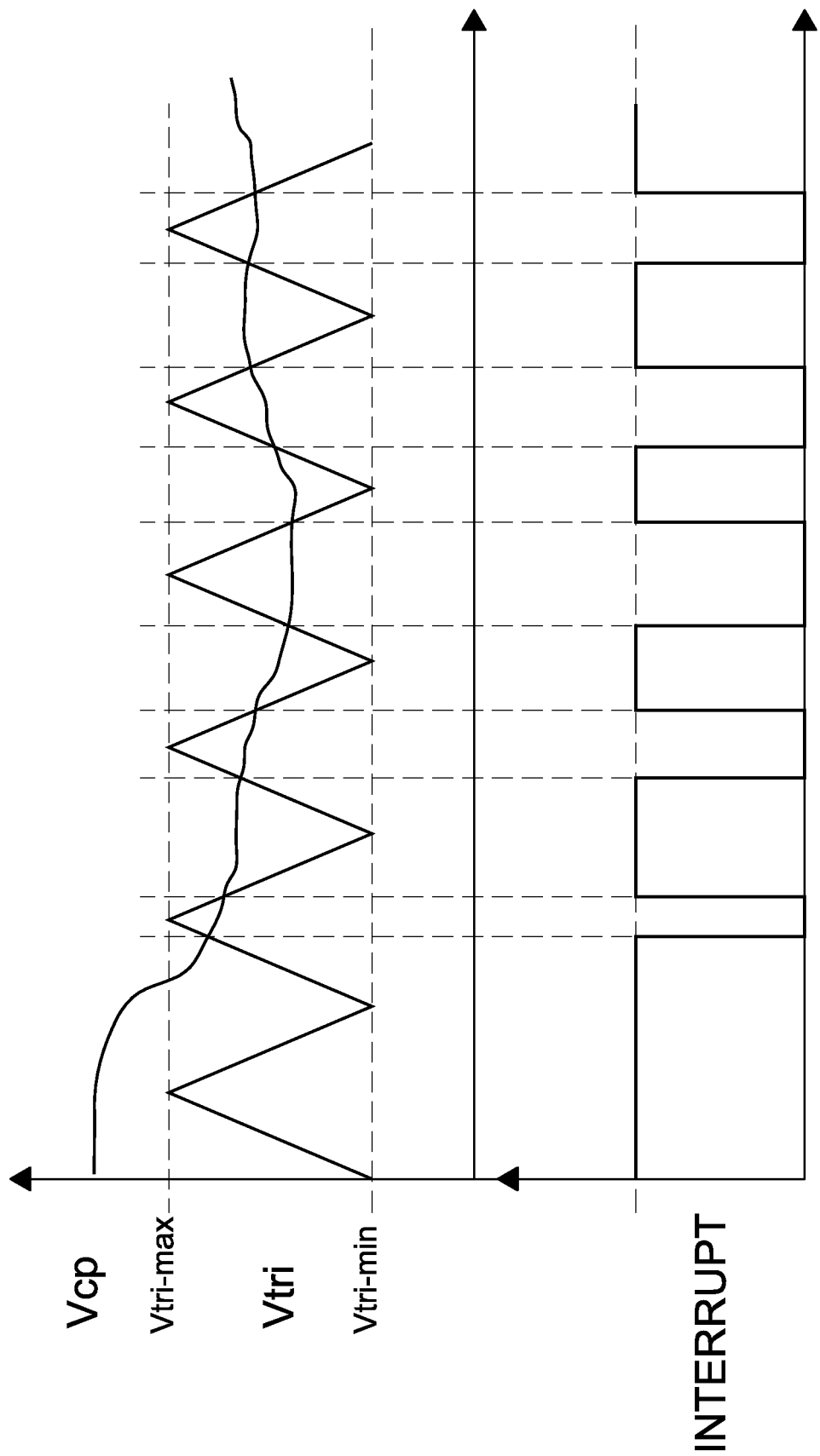
FIG. 6 shows a more detailed example time diagram of the voltage Vcp and the voltage Vtri in FIG. 5B1 and a time diagram of the signal INTERRUPT.

When the voltage Vcp is comprised between the minimum value Vtri-min and the maximum value Vtri-max of the voltage Vtri, the control circuitry 100 alternates a phase A wherein the driving circuit 11 controls the power stage 13 of the VCM 3 for the parking procedure of the read and/or write heads of the VCM 3 (e.g., wherein the signal INTERRUPT is at high logic level) and a phase B wherein the driving circuit 11 is forced to control the power stage 13 in a tristate or brake condition (e.g., wherein the signal INTERRUPT is at low logic level), as shown in FIG. 6; said frequency f determines the alternation of the phases A and B. This alternation occurs with a duty cycle D depending on the position of the voltage Vcp inside the minimum value Vtri-min and the maximum value Vtri-max of the voltage Vtri, that is the duty cycle D is high when the value of the voltage Vcp is next to the maximum value Vtri-max while is low when the value of the voltage Vcp is next to the minimum value Vtri-min. Therefore, considering a time period T=1/f with T=Ton+Toff where Ton indicates the time period wherein the VCM 3 is normally working and Toff the time period wherein the VCM 3 is forced in brake or tristate condition, it is given that D=Ton/T and the signal INTERRUPT is low during the time Toff.

Figure 2:
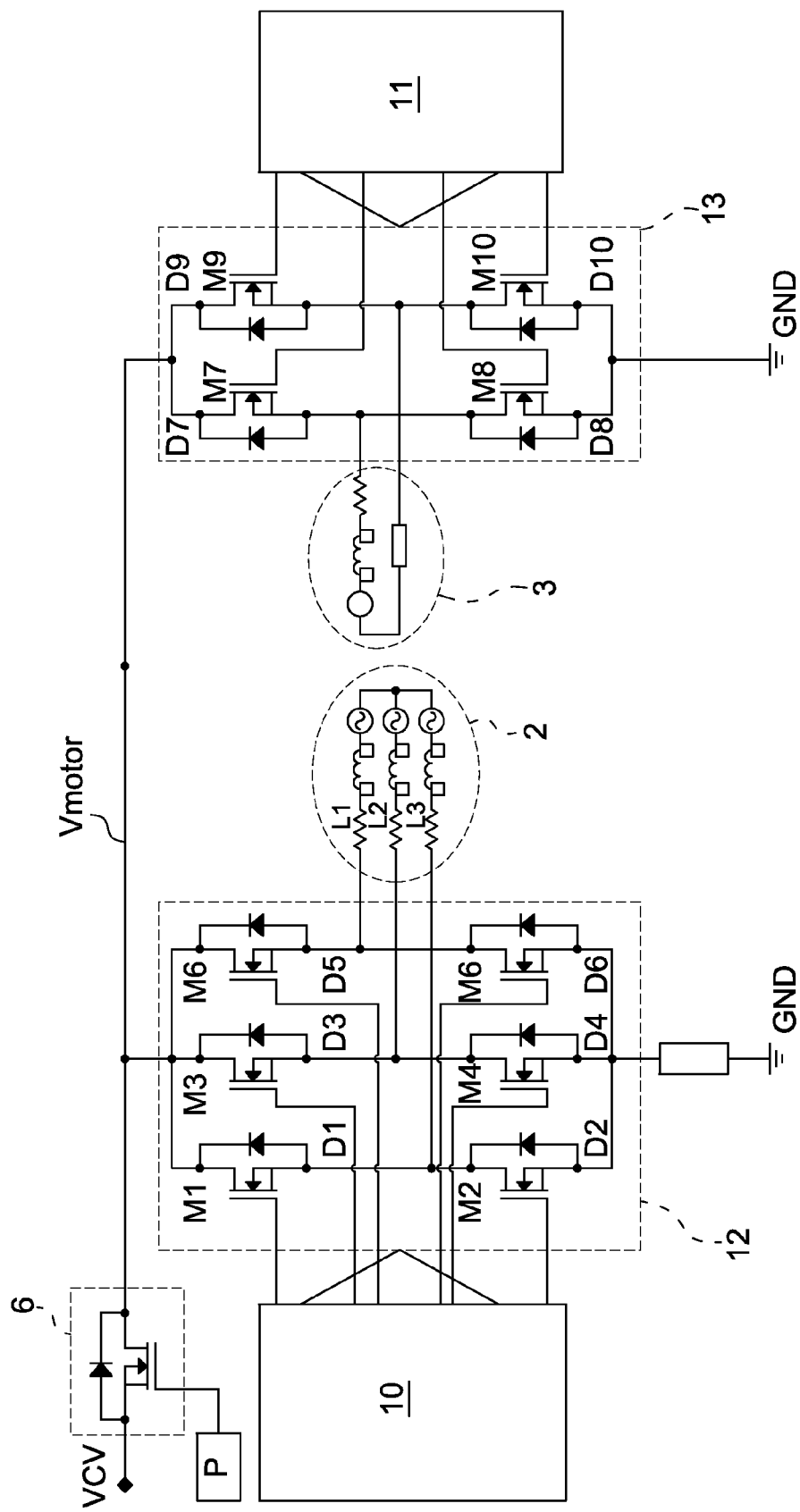
FIG. 2 shows a more detailed diagram of the driving circuit of the spindle motor and voice coil motor of the power combo in FIG. 1.

FIGS. 5A1 and 5A2 show the waveform of voltage Vcp, the current IVCM of the voice coil motor 3 and the voltage Vtri in the case wherein the voice coil motor 3 is driven so as to keep the speed of read and write heads controlled during the parking procedure, that is the constant-speed parking procedure; the time periods wherein the current IVCM is null are the BEMF detection time windows wherein the speed is controlled by detecting the BEMF generated by the same VCM 3 during the tristate phase.

FIGS. 5B1 and 5B2 show the waveform of voltage Vcp, the current IVCM of the voice coil motor 3 and the voltage Vtri in the case wherein the voice coil motor 3 is driven by the stage 13 applying a constant voltage for a certain time period T1, that is the constant-voltage parking procedure.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners. For example, the circuit 100 of FIG. 3 may be combined with the circuit 1 of FIG. 3.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller, comprising:
a first input configured to couple to a charge pump of a hard disk; and
circuitry coupled to the first input and configured to:
compare a signal received at the first input to a reference signal having a frequency, a maximum value and a minimum value; and
generate a head-parking control signal based on the comparison, wherein the circuitry is configured to generate the head-parking control signal with a frequency equal to the frequency of the reference signal when a value of the signal received at the first input is between the maximum value and the minimum value of the reference signal.

2. The controller of claim 1 wherein the head-parking control signal controls cycling of a voice coil motor between a working mode of operation and a stop mode of operation when a value of the signal received at the first input is between the maximum value and the minimum value of the reference signal.

3. The controller of claim 2 wherein the head-parking control signal indicates the working mode of operation when the comparison indicates the signal received at the first input is greater than a value of the reference signal.

4. The controller of claim 2 wherein the head-parking control signal indicates the stop mode of operation when the comparison indicates the signal received at the first input is less than a value of the reference signal.

5. The device according to claim 1 wherein the signal received at the first input is generated by rectification of a back electromotive force voltage of a rotating spindle motor of the hard disk in an absence of an external supply signal.

6. The controller according to claim 1 wherein when the value of the signal received at the first input is between the maximum value and the minimum value, the head-parking control signal has a duty cycle depending on a position of the value of the signal received at the first input inside a value range given by the minimum value and the maximum value of the reference signal.

7. The controller according to claim 6 wherein said duty cycle is high when the value of the signal received at the first input is closer to the maximum value than to the minimum value of the reference signal and low when the value of the signal received at the first input is closer to the minimum value than to the maximum value of the reference signal.

8. The controller according to claim 1, wherein the frequency of the reference signal is out of an audible frequency range.

9. The controller according to claim 2 wherein the controller is configured to drive a voice-coil-motor power stage in one of a tristate mode of operation and a brake mode of operation when the head-parking control signal indicates the stop mode of operation of the voice coil motor.

10. A system, comprising:
voice-coil-motor driving circuitry;
spindle-motor driving circuitry; and
parking-control circuitry configured to:
compare a voltage generated by a back electromotive force to a reference signal having a frequency, a maximum value and a minimum value; and
generate a head-parking control signal based on the comparison, wherein when the voltage generated by the back electromotive force is between the maximum value and the minimum value of the reference signal, the head-parking control signal has a frequency equal to the frequency of the reference signal.

11. The system of claim 10, further comprising:
a spindle-motor power stage; and
a voice-coil-motor power stage.

12. The system of claim 11, further comprising:
a spindle motor; and
a voice-coil motor.

13. The system of claim 10 wherein when the voltage generated by the back electromotive force is between the maximum value and the minimum value of the reference signal, the head-parking control signal controls cycling of a voice-coil motor between a working mode of operation and a stop mode of operation.

14. The system of claim 13 wherein the head-parking control signal indicates the working mode of operation when the comparison indicates the voltage generated by the back electromotive force is greater than a value of the reference signal.

15. The system of claim 13 wherein the head-parking control signal indicates the stop mode of operation when the comparison indicates the voltage generated by the back electromotive force is less than a value of the reference signal.

16. The system of claim 10 wherein the parking-control circuitry is configured to initiate parking of one or more heads of disk drive by a voice-coil motor in response to loss of an external power supply signal.

17. The system of claim 10, wherein the frequency of the reference signal is out of an audible frequency range.

18. The system of claim 13 wherein the voice-coil-motor driving circuitry is configured to drive a power stage of the voice coil motor in one of a tristate mode of operation and a braking mode of operation when the head-parking control signal indicates the stop mode of operation of the voice coil motor.

19. The system of claim 10, comprising an integrated circuit including the voice-coil-motor driving circuitry, the spindle-motor driving circuitry and the parking-control circuitry.

20. A method, comprising:
  comparing a supply voltage signal of a hard disk to a reference signal, the reference signal having a minimum value, a maximum value and a frequency; and
  generating a head-parking control signal based on the comparison, wherein when a value of the supply voltage signal is between the maximum value and the minimum value of the reference signal, the head-parking control signal has a frequency equal to the frequency of the reference signal.

21. The method of claim 20 wherein the reference signal has a triangular wave form with a medium value equal to a target value of the supply voltage signal.

22. The method according to claim 20, comprising generating the supply voltage signal by rectifying a back electromotive force voltage of a rotating spindle motor of said hard disk in absence of an external supply signal.

23. The method of claim 20, comprising controlling, based on the head-parking control signal, cycling of a voice coil motor between a working mode of operation and a stop mode of operation when a value of the signal received at the first input is between the maximum value and the minimum value of the reference signal.

24. The method of claim 23 wherein the head-parking control signal indicates the stop mode of operation when the comparison indicates the supply voltage signal is less than a value of the reference signal.

25. The method of claim 20 wherein when the value of the supply voltage signal is between the maximum value and the minimum value, the head-parking control signal has a duty cycle depending on a position of a value of the supply voltage signal inside a value range given by the minimum value and the maximum value of the reference signal.

26. The method of claim 25 wherein said duty cycle is high when the value of the supply voltage signal is closer to the maximum value than to the minimum value of the reference signal and low when the value of the supply voltage signal is closer to the minimum value than to the maximum value of the reference signal.

27. The method of claim 20, wherein the frequency of the reference signal is out of an audible frequency range.

28. The method of claim 23, comprising driving a voice-coil-motor power stage in one of a tristate mode of operation and a brake mode of operation when the head-parking control signal indicates the stop mode of operation of the voice coil motor.

* * * * *